(12) United States Patent
Yano

(10) Patent No.: US 8,571,874 B2
(45) Date of Patent: Oct. 29, 2013

(54) SPEECH INTERACTIVE APPARATUS AND COMPUTER PROGRAM PRODUCT USING OUTPUT PROMPTS AND USER RESPONSES

(75) Inventor: Takehide Yano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/423,460

(22) Filed: Mar. 19, 2012

(65) Prior Publication Data
US 2012/0179473 A1   Jul. 12, 2012

Related U.S. Application Data

(63) Continuation of application No. PCT/JP2009/066622, filed on Sep. 25, 2009.

(51) Int. Cl.
*G10L 15/22* (2006.01)
(52) U.S. Cl.
USPC ............................................. 704/275
(58) Field of Classification Search
None
See application file for complete search history.

(56) References Cited

U.S. PATENT DOCUMENTS

| | | | |
|---|---|---|---|
| 6,493,673 B1 * | 12/2002 | Ladd et al. | 704/275 |
| 6,539,359 B1 * | 3/2003 | Ladd et al. | 704/275 |
| 6,785,653 B1 * | 8/2004 | White et al. | 704/270.1 |
| 6,882,973 B1 * | 4/2005 | Pickering | 704/270 |
| 7,321,856 B1 * | 1/2008 | Porter et al. | 704/270.1 |
| 7,573,986 B2 * | 8/2009 | Balentine et al. | 379/76 |
| 7,684,990 B2 * | 3/2010 | Caskey et al. | 704/270.1 |
| 7,711,570 B2 * | 5/2010 | Galanes et al. | 704/277 |
| 7,920,682 B2 * | 4/2011 | Byrne et al. | 379/88.18 |
| 7,930,183 B2 * | 4/2011 | Odell et al. | 704/275 |
| 8,131,553 B2 * | 3/2012 | Attwater et al. | 704/270 |
| 2008/0004881 A1 * | 1/2008 | Attwater et al. | 704/275 |

FOREIGN PATENT DOCUMENTS

| | | |
|---|---|---|
| JP | 63-095532 | 4/1985 |
| JP | 60-247697 | 12/1985 |
| JP | 07-219582 | 8/1995 |
| JP | 2002-091489 | 3/2002 |
| JP | 2003-108581 | 4/2003 |
| JP | 2004-163232 | 6/2004 |
| JP | 2004-325848 | 11/2004 |

OTHER PUBLICATIONS

International Search Report for International Application No. PCT/JP2009/066622 mailed on Dec. 22, 2009.
Written Opinion for International Application No. PCT/JP2009/066622.

* cited by examiner

*Primary Examiner* — Talivaldis Ivars Smits
(74) *Attorney, Agent, or Firm* — Turocy & Watson, LLP

(57) ABSTRACT

According to an embodiment, a speech interactive apparatus includes an output unit to output a first prompt; a receiving unit to receive a start instruction of a speech input as a reply to the first prompt; a response control unit to stop the output of the first prompt when the start instruction is received while the first prompt is being output; and a deciding unit to decide on a first determination period, which is used in determining whether a silent state has occurred, based on whether the start instruction is received while the first prompt is being output or based on the timing of receiving the start instruction. When the response is not input during a period starting from the reception of the start instruction till an elapse of the first determination period, the response control unit instructs the output unit to output the first prompt again.

8 Claims, 13 Drawing Sheets

D401: THIS IS FACILITY SEARCH SYSTEM.
        PRONOUNCE THE FACILITY CATEGORY TO BE SEARCHED.
U402: CONVENIENCE STORE
D403: CONVENIENCE STORE. TO PERFORM SEARCH, PRONOUNCE AS "START SEARCH".
        OTHERWISE, PRONOUNCE AS "ANOTHER FACILITY".
U404: START SEARCH
D405: SEARCHING FOR CONVENIENCE STORE.

D401: THIS IS FACILITY SEARCH SYSTEM.
  PRONOUNCE FACILITY CATEGORY TO BE SEARCHED.
U402: CONVENIENCE STORE
D403: CONVENIENCE STORE. TO PERFORM SEARCH, ...(STOPPED)
...(SILENT)...
D403: CONVENIENCE STORE. TO PERFORM SEARCH, PRONOUNCE AS
  "START SEARCH".
  OTHERWISE, ...(STOPPED)
U404: START SEARCH
D405: SEARCHING FOR CONVENIENCE STORE.

D401: THIS IS FACILITY SEARCH SYSTEM.
       PRONOUNCE FACILITY CATEGORY TO BE SEARCHED.
U402: CONVENIENCE STORE
D403: CONVENIENCE STORE. TO PERFORM SEARCH, PRONOUNCE AS
       "START SEARCH".
OTHERWISE, PRONOUNCE AS "ANOTHER FACILITY".
...(SILENT)...
U404: START SEARCH
D405: SEARCHING FOR CONVENIENCE STORE.

FIG.13

D801: THIS IS PROGRAM SEARCH SYSTEM. PLEASE INPUT A SEARCH
   CONDITION.
U802: XX (PERSONAL NAME)
D803: SEARCHING BY XX. 20 RESULTS FOUND
   (+ DISPLAY OF SEARCH RESULT SCREEN).
D804: SEARCH CAN BE NARROWED DOWN BY CATEGORY.
   SELECT ONE OF DRAMA, NEWS, AND SPORTS.
U805: NEWS
D806: PERFORMING REFINED SEARCH BY NEWS.

FIG.14

D801: THIS IS PROGRAM SEARCH SYSTEM.
   PLEASE INPUT A SEARCH CONDITION.
U802: XX (PERSONAL NAME)
D803: SEARCHING BY XX. 20 RESULTS FOUND
   (+ DISPLAY OF SEARCH RESULT SCREEN).
D804: SEARCH CAN BE NARROWED DOWN BY CATEGORY. S...
...(SILENT)...
   (OVERLAPPING DISPLAY OF CATEGORIES THAT CAN BE INPUT)
D804: SEARCH CAN BE NARROWED DOWN BY CATEGORY.
   SELECT ONE OF DRAMA, NEWS, AND SPORTS.
U805: NEWS

D801: THIS IS PROGRAM SEARCH SYSTEM.
PLEASE INPUT A SEARCH CONDITION.
U802: XX (PERSONAL NAME)
D803: SEARCHING BY XX. 20 RESULTS FOUND
(DISPLAY OF SEARCH RESULT SCREEN).
D804: SEARCH CAN BE NARROWED DOWN BY CATEGORY. S...
...(SILENT)...
(OVERLAPPING DISPLAY OF CATEGORIES THAT CAN BE INPUT)
U805: NEWS
D806: PERFORMING REFINED SEARCH BY NEWS.

SPEECH INTERACTIVE APPARATUS AND COMPUTER PROGRAM PRODUCT USING OUTPUT PROMPTS AND USER RESPONSES

CROSS-REFERENCE TO RELATED APPLICATIONS

This application is a continuation of PCT international application Ser. No. PCT/JP2009/066622 filed on Sep. 25, 2009 which designates the United States; the entire contents of which are incorporated herein by reference.

FIELD

Embodiments described herein relate generally to speech interaction.

BACKGROUND

A speech interactive apparatus is an apparatus that receives speech input and accordingly operates devices. Then, depending on the prompt from the apparatus, the user understands the contents which need to be input the next time. Upon receiving an input of a speech input start instruction from the user via, for example, a button; the speech interactive apparatus performs speech recognition of the speech that has been input by the user and outputs the next prompt according to the speech recognition result.

While the speech interactive apparatus is outputting a prompt, if a speech input start instruction is received from the user; then, generally, the speech interactive apparatus stops outputting the prompt being output and gets ready to receive the response from the user. In Japanese Patent No. 3788793, a method is disclosed in which a speech prompt is re-output if the stopping of that speech prompt has not followed by any input from the user, that is, if the stopping of that speech response has followed by a silent state.

However, the situation of receiving a speech input start instruction from the user while the speech interactive apparatus is outputting a prompt may occur when the output of an earlier prompt had been mistakenly terminated. In such a case, for example, even if the prompt is re-output as disclosed in Japanese Patent No. 3788793; unless and until the prompt is re-output, the user is not able to understand what response should be performed next. That represents a case of a lack of user-friendliness.

BRIEF DESCRIPTION OF THE DRAWINGS

FIGS. 7-1 is a diagram illustrating an example of an interaction;
FIGS. 7-2 is a diagram illustrating a timing chart;
FIGS. 8-1 is a diagram illustrating an example of an interaction;
FIGS. 8-2 is a diagram illustrating a timing chart;
FIGS. 9-1 is a diagram illustrating mapping data;
FIGS. 9-2 is a diagram illustrating mapping data;
FIG. 13 is a diagram illustrating an example of an interaction;
FIG. 14 is a diagram illustrating an example of an interaction;
FIGS. 18-1 is a diagram illustrating an example of an interaction;
and
FIGS. 18-2 is a diagram illustrating a timing chart.

DETAILED DESCRIPTION

Figures 1, 2:
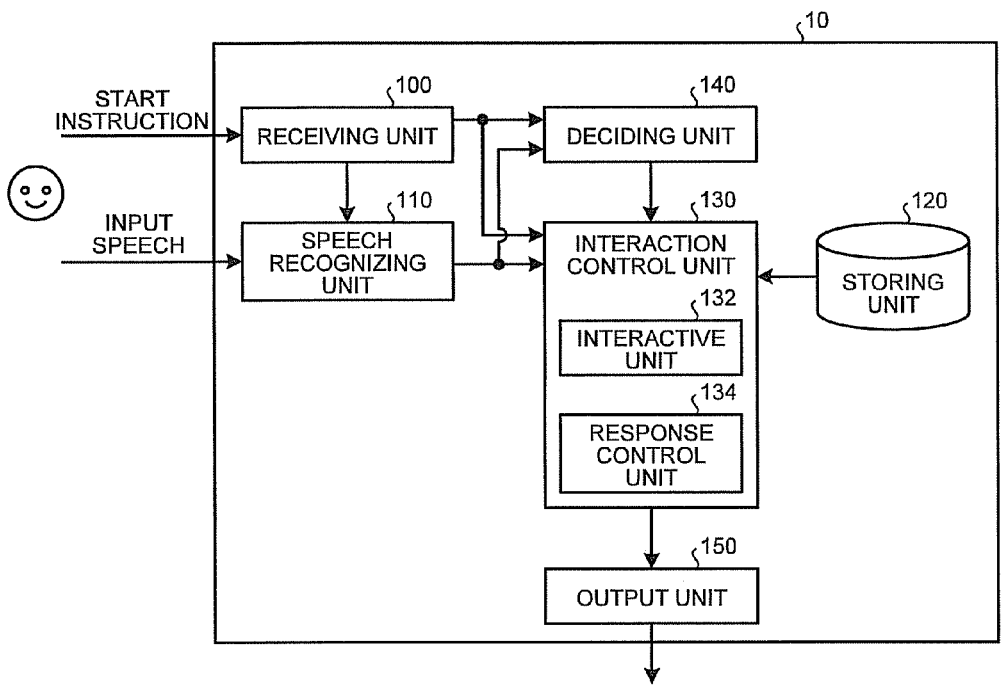
FIG. 1 is a block diagram of a speech interactive apparatus 10.
FIG. 2 is a diagram illustrating an example of an interaction.

According to an embodiment, a speech interactive apparatus includes an output unit configured to output a first prompt which needs to be notified to a user; a receiving unit configured to receive a start instruction of a speech input from the user as a reply to the first prompt; a speech recognizing unit configured to perform speech recognition of a response that is input by the user; an interactive unit configured to decide on a second prompt, which is determined according to a speech recognition result of the response, based on interaction information stored in a storing unit and instruct the output unit to output the second prompt; a response control unit configured to stop the output of the first prompt when the start instruction is received while the first prompt is being output; and a deciding unit configured to decide on a first determination period, which is used in determining whether or not a silent state has occurred, based on whether or not the start instruction is received while the first prompt is being output or based on the timing of receiving the start instruction. When the response is not input during a period starting from the reception of the start instruction till an elapse of the first determination period, the response control unit determines that the silent state has occurred and instructs the output unit to output the first prompt again.

Various embodiments will be described hereinafter with reference to the accompanying drawings.

While a speech interactive apparatus is outputting a prompt, if a speech input start instruction is received from the user; then the speech interactive apparatus stops outputting the prompt being output, and waits for a speech input from the user. If the speech of the user is not detected for a predetermined period (T) (hereinafter, referred to as determination period) since receiving the speech input start instruction, the speech interactive apparatus determines that a silent state has occurred.

When a silent state is determined to have occurred, that is, when the predetermined period (T) elapses without the detection of the speech of the user; the speech interactive apparatus outputs the prompt speech that was stopped again (hereinafter, outputting again is referred to as re-outputting). With that, it becomes possible to re-notify the user of the prompt that was stopped.

If the determination period (T) is set to be of a short duration, then the speech interactive apparatus happens to re-output the prompt at an earlier timing. That hastens the user to perform the speech input. Thus, the system gives the user no leeway, which is not desirable. From this perspective, it can be said that setting the determination period (T) to a sufficiently long duration leads to an enhancement in the usability.

However, in case the user mistakenly terminates a prompt from the speech interactive apparatus, then the user is not able to understand what speech input to perform next and thus goes silent. In such a situation, if the determination period (T) is set to be of a longer duration and if the condition of no re-outputting of the prompt persists, then the user may speculate the speech to be input at that time and accordingly perform the speech input. However, there is no guarantee that such a speech input matches with the grammar awaited by the speech interactive apparatus. Hence, that speech input may cause false recognition/erroneous operation. Moreover, in the case when the configuration is to automatically detect a speech input start instruction; there is also a possibility of an erroneous detection operation.

In order to avoid such a situation from occurring, the speech interactive apparatus according to the first embodiment adaptively changes the determination period (T) and, in some instances, re-outputs a prompt at an earlier timing with the aim of curbing an erroneous input from the user.

As illustrated in FIG. 1, a speech interactive apparatus 10 according to a first embodiment includes a receiving unit 100, a speech recognizing unit 110, a storing unit 120, an interaction control unit 130, a deciding unit 140, and an output unit 150. The interaction control unit 130 further includes an interaction unit 132 and a response control unit 134.

The receiving unit 100 receives a start instruction that is issued by the user for starting a speech input. Thus, a start instruction represents information that indicates the start of a speech input by the user. In the first embodiment, when the user presses a start button (not illustrated) that is provided in the speech interactive apparatus 10; that action is considered as a trigger and, upon detection of such a trigger, a start instruction is received. Upon receiving a start instruction, the receiving unit 100 notifies the speech recognizing unit 110 and the interaction control unit 130 of a speech input start event, which indicates that a start instruction has been received.

As another example, the output from various sensors such as an acceleration sensor or a tilt sensor can also be considered as a trigger. Thus, the detection of a trigger can be performed by implementing known techniques. Moreover, as still another example, once the output unit 150 (described later) has output a prompt through to completion, the speech interactive apparatus 10 can wait for a predetermined period of time before automatically falling in a state corresponding to the reception of a trigger in preparation for the start of another speech input from the user. Besides, as still another example, instead of the pressing of the start button, another predetermined operation by the user can also be considered as a trigger.

The speech recognizing unit 110 receives a notification of a speech input start event from the receiving unit 100 and waits for the response that has been input by the user into a microphone. Upon obtaining the response, the speech recognizing unit 110 performs speech recognition with respect to the obtained response and sends the speech recognition result to the interaction control unit 130. Besides, upon obtaining the response, the speech recognizing unit 110 notifies the interaction control unit 130 of a speech detection event. Meanwhile, while performing speech recognition, if an instruction to cancel the speech recognition operation is received from the interaction control unit 130, the speech recognizing unit 110 stops performing the speech recognition operation. Herein, the speech recognizing unit 110 performs speech recognition by implementing a known method.

The storing unit 120 stores therein interaction information. Herein, the interaction information is, for example, an interaction scenario for having an interaction as illustrated in FIG. 2. In FIG. 2, "U(number)" represents responses input by the user and "D(number)" represents prompts output by the speech interactive apparatus 10. The prompts represent the speech information to be notified to the user. The numbers that follow the letter U or the letter D are referred to and the interaction is advanced using the speech inputs from the user and the speech output of prompts from the speech interactive apparatus 10.

Figure 3:
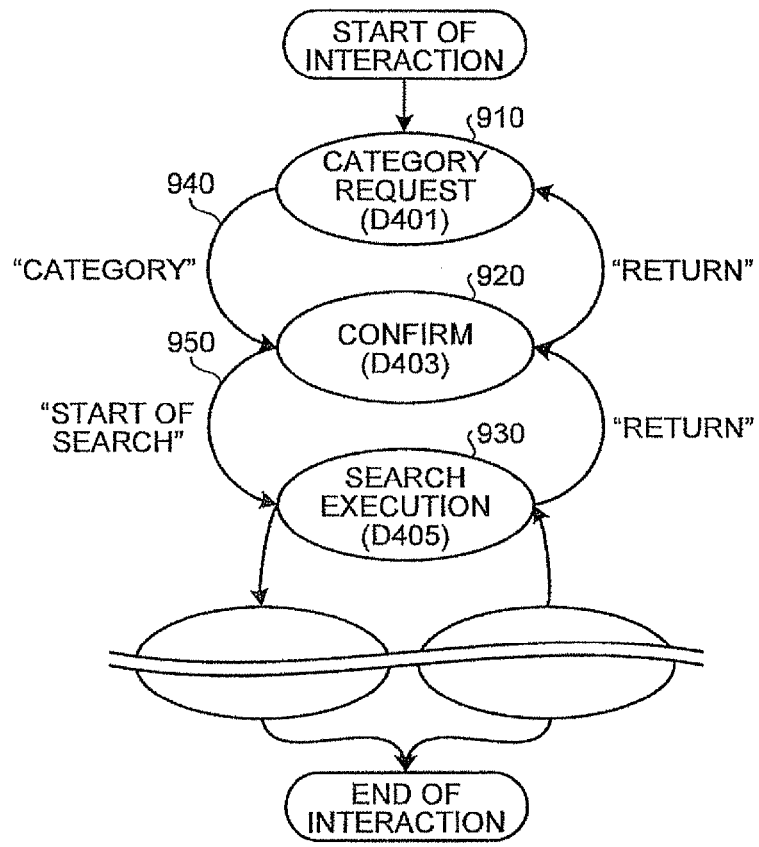
FIG. 3 is a diagram illustrating an example of an interaction scenario.

As illustrated in FIG. 3, an interaction scenario is a description in the form of a state transition diagram of the progress status of an interaction between the speech interactive apparatus 10 and the user. In the example illustrated in FIG. 3, in response to the user inputs, the system transits in various states in the order of "category request" (910), "confirmation" (920), and "search execution" (930). In each of those states, the speech interactive apparatus 10 outputs a corresponding prompt (D401, D403, D405) and waits for an input from the user. The inputs from the user correspond to arcs illustrated to connect the states. Herein, it is assumed that a search category specification (940) is input for the transition from 910 to 920 and a keyword "start of search" is input (950) for the transition from 920 to 930. Meanwhile, "<category>" specified in 940 does not point to any particular keyword but points to, as a whole, the keywords representing a category.

During the interaction performed in accordance with the interaction scenario illustrated in FIG. 3, the speech interactive apparatus 10 issues a request for the facility category that is to be searched at the beginning (D401). With respect to that request, the user performs a speech input of the category (convenience store) (U402). Then, the speech interactive apparatus 10 confirms whether or not to perform a search for the category that has been notified in the speech recognition result (D403). When the user gives the confirmation (U404), the speech interactive apparatus 10 performs a search with the specified condition (D405).

The interactive unit 132 of the interaction control unit 130 refers to the above-mentioned interaction scenario and performs transition of states during the interaction according to the responses of the user. When it is determined that the interaction with the user has reached the end of the interaction scenario, the interactive unit 132 closes the interaction with the user. Thus, with a single interaction operation, it becomes possible to acquire, for example, the desired information from the user. That is, based on the speech recognition result of the speech recognizing unit 110 and based on the interaction information stored in the storing unit 120, the interactive unit 132 determines the prompts to be output the next time and instructs the output unit 150 to output the determined prompts. Moreover, at the time of starting the output of a prompt, the interactive unit 132 notifies the deciding unit 140 of a response start event. Furthermore, at the time when a prompt is completely output, the interactive unit 132 notifies the deciding unit 140 of a prompt end event.

Meanwhile, as another example, as interaction information, the storing unit 120 can store therein an information group that is set in advance and needs to be obtained from the user. In this case, the interactive unit 132 sets the information group obtained from the user to an interaction state, compares that information group with an information group stored in the storing unit 120, and checks with the user about the lacking information via the output unit 150. In this way, as long as the interactive unit 132 determines the prompts based on the responses of the user and based on the interaction information stored in the storing unit 120, the determination method is not limited to the first embodiment.

The deciding unit 140 decides on the determination period (T) based on the response start event obtained from the interaction control unit 130, based on the response end event obtained from the interaction control unit 130, and based on the timing at which the speech input start event was notified. Herein, the determination period (T) is used in determining whether or not the user is in the silent state. The method of deciding the determination period (T) is described later.

If a speech start event is obtained while the output unit 150 is outputting a prompt, then the response control unit 134 of the interaction control unit 130 stops the output of the prompt that is being output at that time. Moreover, since receiving a speech input start instruction, if no response is input for the determination period (T); then the response control unit 134 determines that a silent state has occurred and instructs the output unit 150 to re-output the stopped prompt from the start position. Meanwhile, since the determination period (T) is a variable value determined by the deciding unit 140, it is possible to change the timing of re-outputting prompts.

Herein, as long as the information that is re-output informs the user about the requested information that was requested to the user in the stopped prompt, the re-outputting need not be limited to the stopped prompt. Moreover, as far as the output start position of an stopped prompt to be re-output is concerned, the start position of the prompt can be substituted with the stopped position of the prompt. Thus, the output start position is not limited to that explained in the embodiments.

In the case of re-outputting an stopped prompt, the response control unit 134 instructs the speech instructing unit 110 to cancel the speech recognition and to stop the speech recognition operation. Thus, while an stopped prompt is being re-output, the interactive unit 132 avoids outputting a prompt according to the speech recognition result. Alternatively, the configuration can be such that, while re-outputting a prompt, the speech recognition result output at that time is destroyed and no operation is performed.

Figure 4:
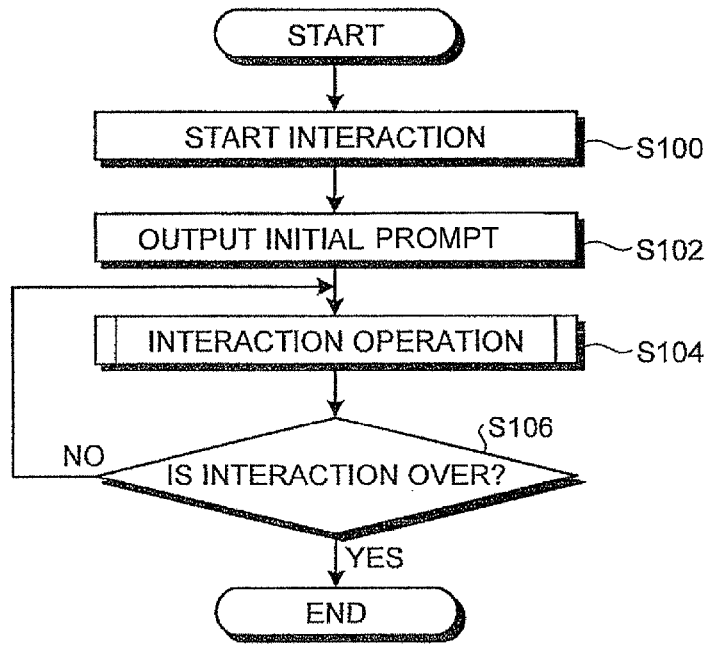
FIG. 4 is a flowchart for explaining a speech interaction operation.

As illustrated in FIG. 4, during a speech interaction operation, firstly, the interactive unit 132 of the speech interactive apparatus 10 follows a user instruction and starts an interaction using interaction information (Step S100), and instructs the output unit 150 to output an initial prompt (Step S102). Then, the interactive unit 132 waits for an response from the user. Meanwhile, the initial prompt is not mandatory and thus may not be output.

Subsequently, the interaction control unit 130 advances the interaction by performing the interaction operation in which the responses of the user are repeatedly obtained by the speech recognizing unit 110 and the prompts depending on the speech recognition results of the responses are repeatedly output by the output unit 150 (Step S104). The interaction operation (Step S104) is repeated (No at Step S106) until the interaction is over. Once the interaction gets over (Yes at Step S106), the speech interaction operation is completed.

During the interaction operation (Step S104), upon being notified of a speech input start event, not only the case in which the speech recognizing unit 110 obtains an response of the user is taken into consideration but also the case in which the speech recognizing unit 110 does not obtain an input speech of the user is taken into consideration. In either of the cases, some kind of a prompt is output from the output unit 150 during the interaction operation (Step S104).

Figure 5:
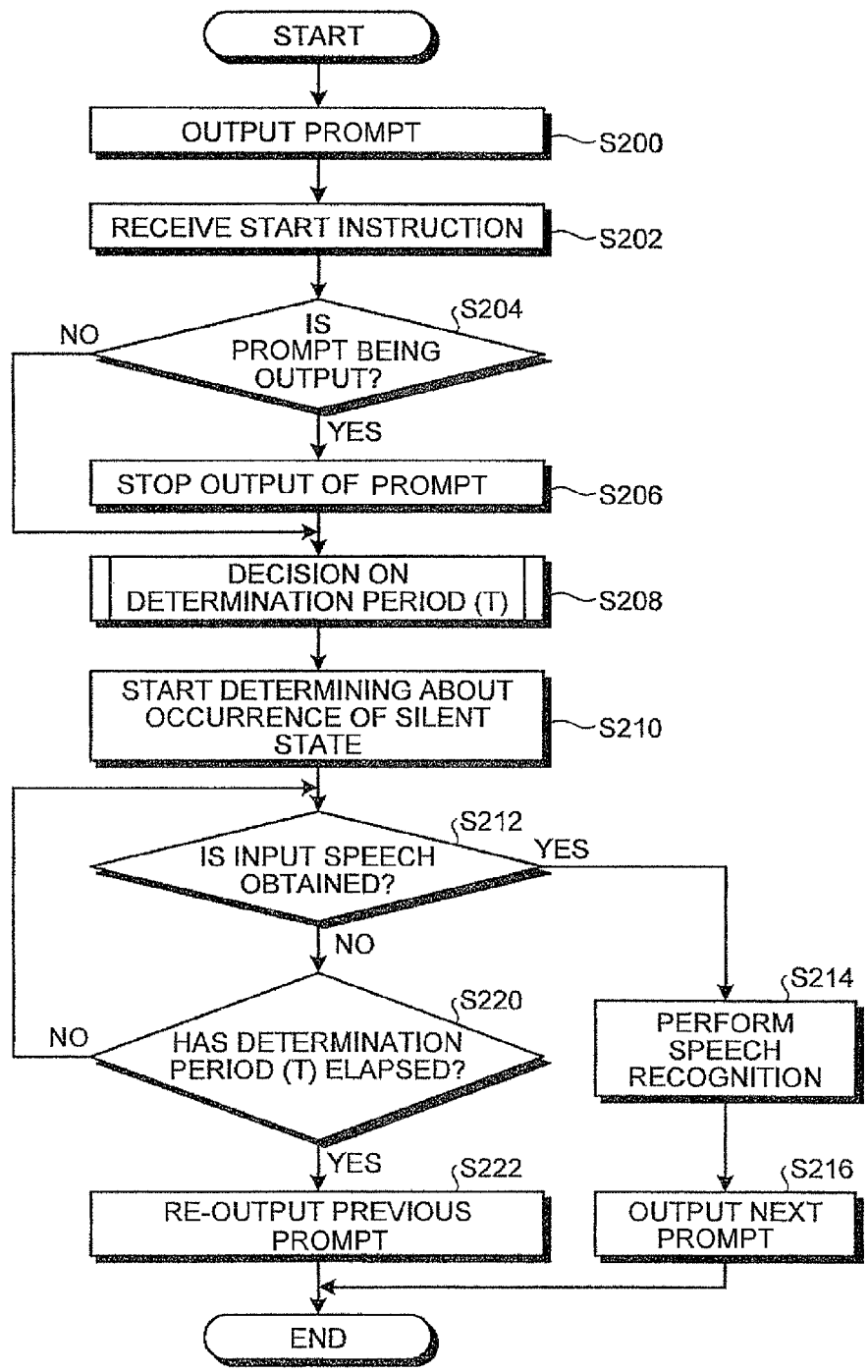
FIG. 5 is a flowchart for explaining an interaction operation.

As illustrated in FIG. 5, during the interaction operation (Step S104), firstly, the output unit 150 outputs a prompt determined by the interactive unit 132 (Step S200). At that time, the interactive unit 132 notifies the deciding unit 140 of a response start event. Then, if the receiving unit 100 receives a start instruction from the user (Step S202), then the response control unit 134 determines whether or not the output unit 150 is currently outputting a prompt. If the output unit 150 is currently outputting a prompt (Yes at Step S204), then the response control unit 134 stops that prompt from being output (Step S206). On the other hand, if the output unit 150 is currently not outputting a prompt (No at Step S204), the system control proceeds to Step S208.

Subsequently, the deciding unit 140 decides on the determination period (T) (Step S208). The method of deciding the determination period (T) is described later. Then, the response control unit 134 starts determining whether or not the silent state has occurred (Step S210). More particularly, the response control unit 134 obtains the determination period (T) from the deciding unit 140. Then, the response control unit 134 monitors the time starting from the timing at which the speech input start event was notified till the elapse of the determination period (T). Subsequently, as and when the speech recognizing unit 110 obtains a response of the user (Yes at Step S212), it performs speech recognition of the response (Step S214). At that time, the interactive unit 132 determines a prompt based on the speech recognition result and based on the interaction scenario, and the output unit 150 outputs the prompt that has been determined (Step S216). That is, the response output at Step S216 needs to be output subsequent to the response output at Step S200.

In this way, if a response of the user is received before the silent state is determined to have occurred, then the subsequent prompt is output by following the normal interaction.

In contrast, at Step S212, if the speech recognizing unit 110 does not obtain the response (No at Step S212) and if the determination period (T) has not yet elapsed (No at Step S220); then the system control returns to Step S212. On the other hand, at Step S220, if the determination period (T) has elapsed (Yes at Step S220); then the response control unit 134 instructs the output unit 150 to re-output the previously-output prompt (Step S222). Herein, the previously-output prompt points to the response output at Step S200.

In this way, when the silent state is determined to have occurred, the previously-output prompt is output again. As a result, in case a speech input is not performed even when the user presses the start button with the intention of performing a speech input; the same prompt is re-output so as to let the user know the contents which need to be input and to prompt the user to perform a speech input.

Explained below is the operation of deciding the determination period (T) (Step S206). Firstly, the deciding unit 140 measures a time length To starting from a response start timing Ts up to the notification of a speech input start event. Herein, the response start timing Ts is the timing at which a response start timing is notified against the response output at Step S200. Then, by referring to the time length To, the determination period (T) for silent state is calculated according to (Expression 1).

$$T = a + (Td - a) * (To/b)(To < b) \quad \text{Expression 1}$$
$$= Td \begin{pmatrix} \text{no stopping until } To \geq \\ b \text{ or up to response end event} \end{pmatrix}$$

where, Td is a default determination period that is set when the output of a prompt is not stopped until the notification of a response end event.

Moreover, "a" is a positive constant. With the addition of "a"; as the time length To approaches zero, the determination period approaches zero. Thus, in the case when the user intentionally stops a prompt, it becomes possible to avoid a situation in which an operation of re-outputting that prompt is performed before the start of a speech input. Meanwhile, "b" is a positive integer that determines the extent of increase in the determination period (T). Alternatively, "b" can also be an estimated time of outputting a prompt.

In this way, depending on whether or not a start instruction has been received while a prompt is being output, the deciding unit 140 decides on the determination period. Moreover, if a start instruction is received during the output of a prompt or after a prompt has been output, the deciding unit 140 decides on the determination period based on the timing of receiving the start instruction.

Meanwhile, as long as the deciding unit 140 decides on the determination period (T) that increases along with an increase in the time period To, the method of deciding the determination period (T) is not limited to that explained in the embodiments.

During the period in which the user is paying attention to a prompt from the speech interactive apparatus 10, it is less likely that the user stops the prompt and starts a speech input. Regarding a situation in which the speech interactive apparatus 10 receives a speech input start instruction while outputting a prompt, the following two cases can be taken into consideration: a case when, midway through a prompt, the user understands the contents to be input and intentionally notifies the speech interactive apparatus 10 of the start of a speech input; and a case when a speech input start instruction is received because of a mistake from the user or an error by the speech interactive apparatus 10.

When a speech input start instruction is received by mistake, a prompt gets stopped at an unexpected situation for the user thereby causing confusion in the user's mind. Therefore, the user may not be able to immediately start a speech input. Moreover, since the prompt is stopped, the user is not able to refer to the prompt to understand the necessary information that needs to be input, and is thus forced to speculate the contents to be input. That is why it is desirable to notify the user of the demands of the speech interactive apparatus 10 and to ensure that the user does not perform erroneous input based on speculation.

On the other hand, in the case of intentionally notifying the start of a speech input, the user starts the speech input immediately after notifying the speech interactive apparatus 10 about the same. Hence, even when the determination period is set to a small value, it is less likely that a prompt is re-output.

As described above, in the speech interactive apparatus 10 according to the first embodiment, if a speech input start event is notified while a prompt is being output, that is, if a start instruction is received while a response is being output; then the determination period (T) is set to be relatively shorter with the aim of shortening the period after which the prompt is re-output. As a result, in case the start button is mistakenly pressed, it becomes possible to re-output the prompt at an earlier timing.

In contrast, when the user intentionally presses the start button, the speech input is performed before the elapse in the determination period (T). Hence, no inconvenience is caused. In this way, when a speech input start event is notified at a timing closer to the notification of a response start event, the determination period (T) is set to be relatively shorter. That enables achieving an enhancement in the robustness without diminishing the usability during the interaction.

Meanwhile, if a prompt is not stopped till the end, then it is likely that the user has understood the contents to be input. Accordingly, there is no need to hurry for re-outputting the prompt. Thus, the determination period (T) can be set to a sufficiently long duration for the purpose of waiting for a response from the user. There, in the first embodiment, when the time length To is equal to or greater than "b" or when a prompt is not stopped until the notification of a response end event, the maximum length of the time Td is set as the determination period (T).

As described above, the speech interactive apparatus 10 sets the determination period in an adaptive manner depending on the status of the user. That enables achieving enhancement in the usability.

Figure 6:
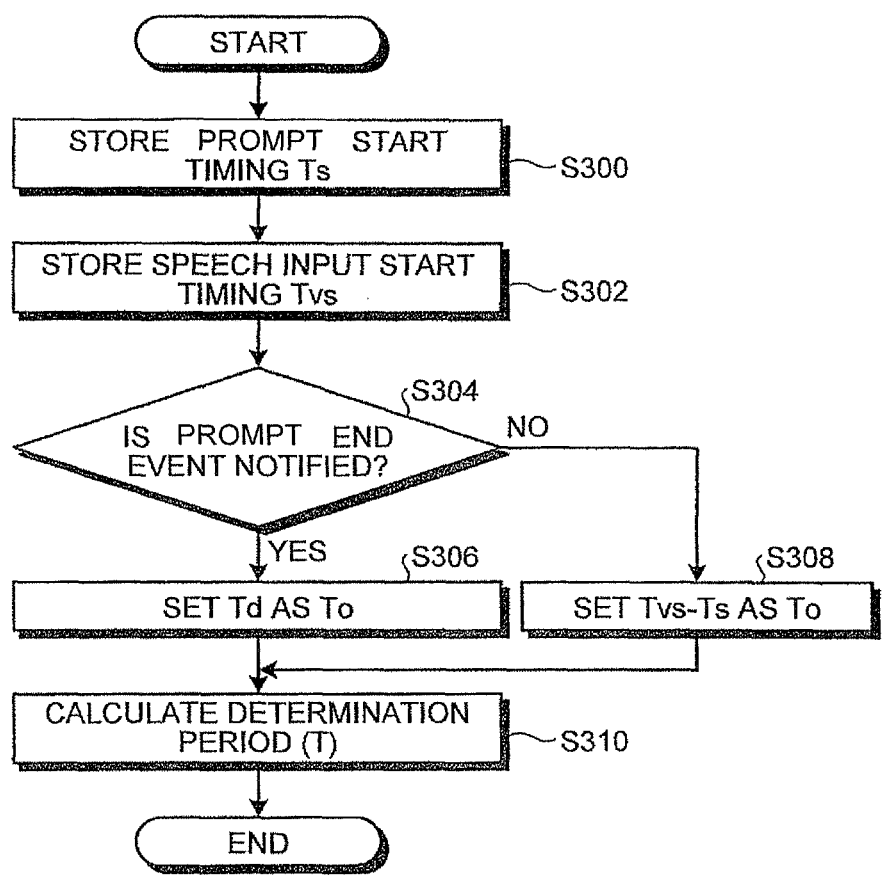
FIG. 6 is a flowchart for explaining a determination period deciding operation.

Explained below in detail are the operations performed in a determination period deciding operation. As illustrated in FIG. 6, when a response start event is notified, the deciding unit 140 stores the timing of notification as the response start timing Ts (Step S300). Subsequently, when a speech input start event is notified, the deciding unit 140 stores the timing of notification as a speech input start timing Tvs (Step S302). Herein, the response start event notified at Step S300 is issued against the prompt output by the output unit 150 at Step S200. Besides, the speech input start event notified at Step S302 is issued against the start instruction received by the receiving unit 100 at Step S202.

Prior to the notification of the speech input start event at Step S302, if a response end event is notified (Yes at Step S304); then the deciding unit 140 sets the default value Td as the time length To (Step S306). Herein, the case in which a response end event is notified prior to the notification of a speech input start event corresponds to the case in which the output of a prompt performed at Step S204 is complete and the stopping of the output of the prompt at Step S206 is not performed.

Meanwhile, at Step S304, if a response end event is not notified prior to the notification of a speech input start event (No at Step S304), then the deciding unit 140 sets the difference between the speech input start timing Tvs and the response start timing Ts as the time length To (Step S308). Then, using the time length To set at Step S306 or Step S308 and using (Expression 1), the deciding unit 140 decides on the determination period (T) (Step S310). That marks an end of the determination period deciding operation.

Figures 1, 2, 7:
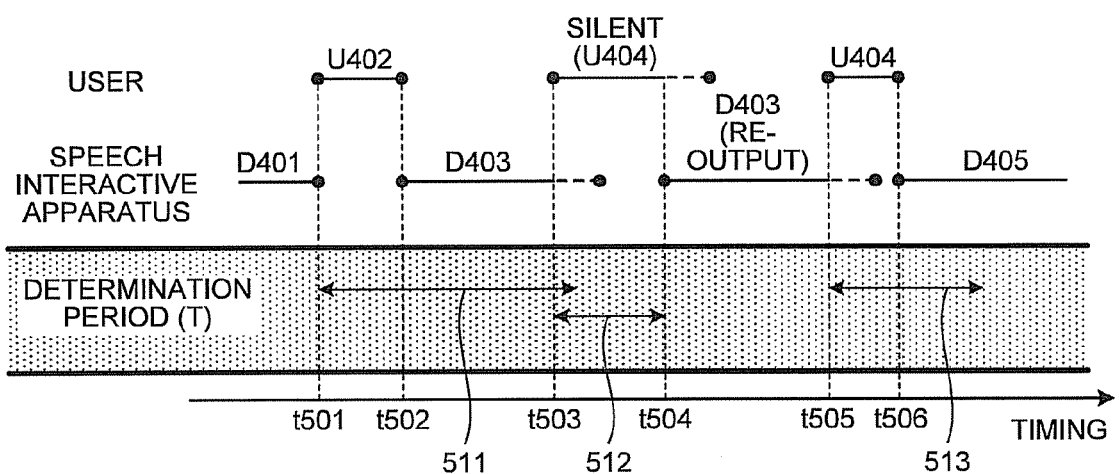

Explained below is a specific speech interaction operation. Firstly, the explanation is given for a case when the user stops the output of a prompt at a relatively earlier timing since the start of the output. As illustrated in FIGS. 7-1, during the output of a prompt at D403, assume that the user mistakenly presses the start button at the point of time when the prompt is output up to "to perform search,". In this case, the user is not able to understand what contents need to be input and thus goes silent. As a result, the speech interactive apparatus 10 cannot obtain the next response (U404).

FIGS. 7-2 is a diagram illustrating a timing chart corresponding to the interaction example illustrated in FIGS. 7-1. In FIGS. 7-2, the horizontal lines illustrated on the side of "user" indicate the timings of speech inputs performed by the user. Moreover, the horizontal lines illustrated on the side of "speech interactive apparatus" indicate the timings at which the speech interactive apparatus 10 outputs responses. For example, it is illustrated that U402 is input between a timing t501 and a timing t502. Moreover, arrows (511 to 513) illustrated on the side of "determination period T" indicate the determination periods (T) decided by the deciding unit 140 during the determination period deciding operation (Step S208) illustrated in FIG. 5.

In the present example, since the prompt D401 is not stopped; the time Td that is sufficiently long is set as the determination period (T), which is set at the point of time when the user starts the response U402 (511). Then, the prompt D403 is output. However, since the user has mistakenly pressed the start button at an earlier stage, the prompt D403 is stopped without being completely output and the speech recognizing unit 110 falls into a state of waiting for the response (silent). In that case, as compared to Td, the time length To becomes shorter; and as compared to the determination period (T) (511), the determination period (T) also becomes shorter (512).

Because of having mistakenly pressed the start button, the user is not able to understand what contents to input and thus goes silent (silent (U404)). If the determination period (T) (512) elapses in that period, then the speech interactive apparatus 10 re-outputs the previous prompt (D403 (re-outputting)).

From the prompt that is re-output at the timing t504, the user understands that a "starting search" command is to be input next and thus can confirm the contents that need to be input. Then, the user starts a speech input before outputting of the prompt is complete (U404).

In this case too, since the prompt D403 that was re-output at the timing t504 has been stopped from being output, the time length TO becomes short and the determination period (T) is set to be relatively shorter (513). However, in this case, since the user knows the contents to be input, a speech input can be performed at an earlier timing (timing t505). That is, the user can perform a speech input before the elapse in the determination period (T).

Figures 1, 2, 8:
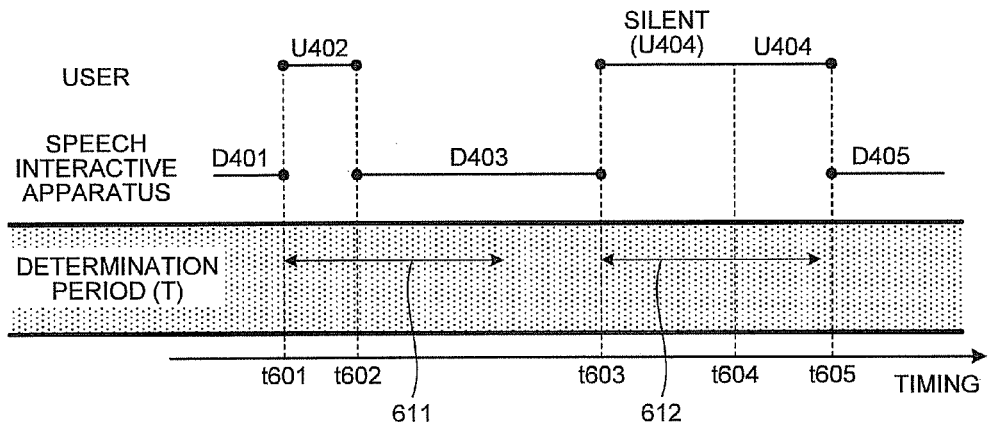

Given below is the explanation regarding a case in which, once the prompt is output till the end without being stopped, the user thinks for a relatively longer period before performing a speech input. As illustrated in FIGS. 8-1 and FIGS. 8-2, the prompt D403 is output without being stopped and the time Td that is sufficiently long is set as the determination period (T) (612). In that case, even if the user goes silent and does not perform a speech input after the prompt D403, the determination period (T) of a long duration ensures that no unnecessary re-outputting is performed.

In this way, in the case when the user goes silent after the prompt has been output till the end, it is likely that the user is thinking of something. If the user is thinking of something, then it is not very likely that the user stops a prompt from being output and thus the prompt is output until the latter half or until the end. There, when the majority of the prompt is output, lengthening the determination period (T) ensures that the thinking of the user is not obstructed.

In this way, in the speech interactive apparatus 10 according to the first embodiment, the length of the determination period (T) is changed based on the position at which a prompt output by the speech interactive apparatus 10 is stopped. Hence, it can be ensured that erroneous input is not performed.

According to the first embodiment, the receiving unit 100 receives a start instruction for speech input by a trigger of a modality other than the speech. Alternatively, according to a first modification example of the first embodiment, the start of an input can also be detected from the speech signals that are input. For example, a speech input can be determined to have been started when a particular keyword is detected from the speech input performed by the user. Alternatively, as another example, a speech input can be determined to have been started when it is detected that the speech of the user is aimed at the speech interactive apparatus 10. In that case, the receiving unit 100 and the speech recognizing unit 110 can be shared in a single speech recognizing engine.

Moreover, in the first embodiment, the prompts from the speech interactive apparatus 10 are limited to speech during an interaction. Alternatively, according to a second modification example, it is also possible to make use of, for example, visual information such as images as prompts. If the requested contents are presented to the user in the form of visual information, then the user is able to quickly understand the contents to be input. That makes it possible to set the determination (T) to a long duration.

Figures 1, 9:
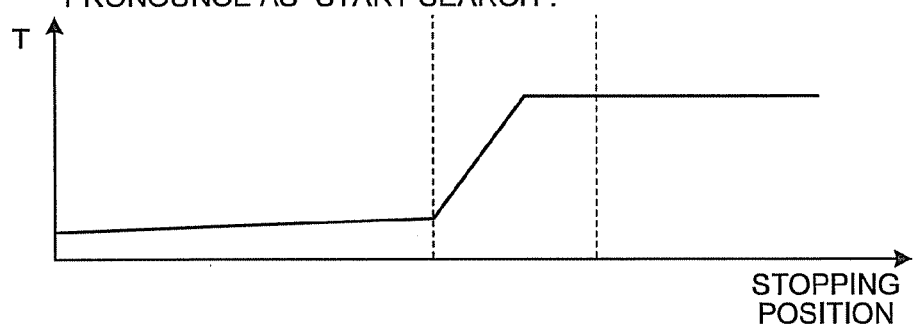
Figures 2, 9:
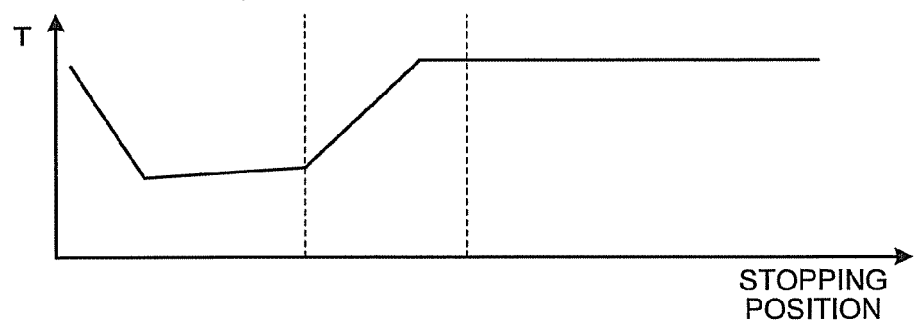

According to a third modification example, mapping data indicating a relationship between the stopping positions of prompts and the determination periods (T) can be stored in the deciding unit 140, so that the deciding unit 140 can determine the determination periods (T) based on the mapping data. In the mapping data, from among the prompt contents, the determination period (T) is set to be relatively shorter for commands that can be subjected to speech inputs or for positions until the types of requested information are output. For positions after the explanation regarding commands is completed, the determination periods (T) are set to have great values. In FIGS. 9-1, until a "starting search" command that can be subjected to a speech input is output, the determination periods (T) are set to be short duration. Once the "starting search" command is output, the determination periods (T) are set to have greater values.

Moreover, as illustrated in FIGS. 9-2, at the time when the explanation is started regarding a command serving as an alternative to the already-output commands, the determination period (T) is again set to have a small value under the assumption that the user did not wish to input previously-presented command. However, since there remains a possibility that the user inputs the previously-presented command, the determination period (T) can be set to a greater value as compared the initial stage. Then, after the next command (in the example illustrated in FIGS. 9-2, "another facility") is output, the determination period (T) is set to a greater value.

In this way, by making the use of mapping data, it becomes possible not only to set the time course but also to set the determination period (T) depending on the position of stopping. As a result, the timing for re-outputting a prompt can be determined in an appropriate manner.

Meanwhile, the mapping data can also be generated automatically by analyzing the text data of a prompt sentence. For example, in a prompt sentence, sections such as "pronounce as ~" or "select from ~" or "please ~" that prompt the user to perform speech input are retrieved. Since it can be considered that such sections are followed by commands, the determination periods (T) immediately after such sections are set to greater values. Moreover, if there exists a section such as "in the case of ~" that gives explanation of alternative options; it can be considered that such a section is followed by a command. Hence, the determination period (T) immediately after such a section is set to a greater value.

Given below is the explanation regarding a speech interactive apparatus 12 according to a second embodiment. The speech interactive apparatus 12 advances an interaction with the user by outputting, as prompts, not only speech information but also image information.

Figure 10:
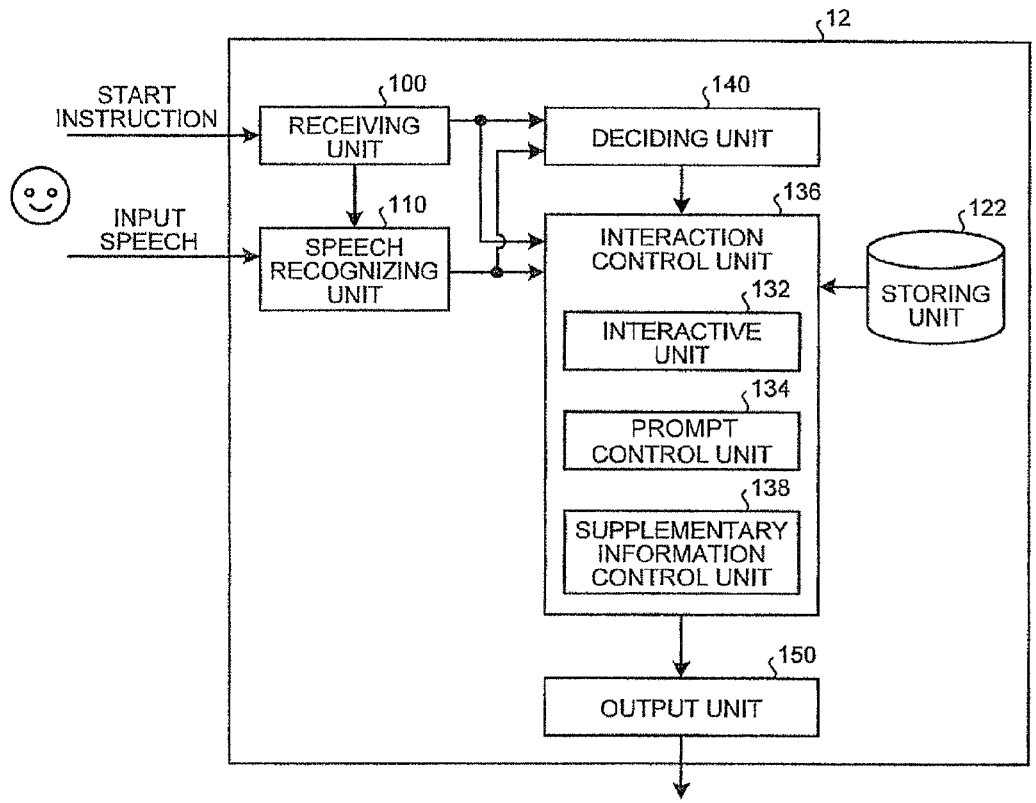
FIG. 10 is a block diagram of a speech interactive apparatus 12.

As illustrated in FIG. 10, in the speech interactive apparatus 12, an interaction control unit 136 includes a supplementary information control unit 138 in addition to the configuration identical to the configuration of the interaction control unit 130 according to the first embodiment. When the response control unit 134 re-outputs a prompt, the interaction control unit 136 instructs the output unit 150 to output supplementary information. Herein, the supplementary information is image information that contains information about the response that the user needs to input as a reply to the prompt that has been re-output. More particularly, the supplementary information is a command list containing information that the user can input at that point of time.

Figure 11:
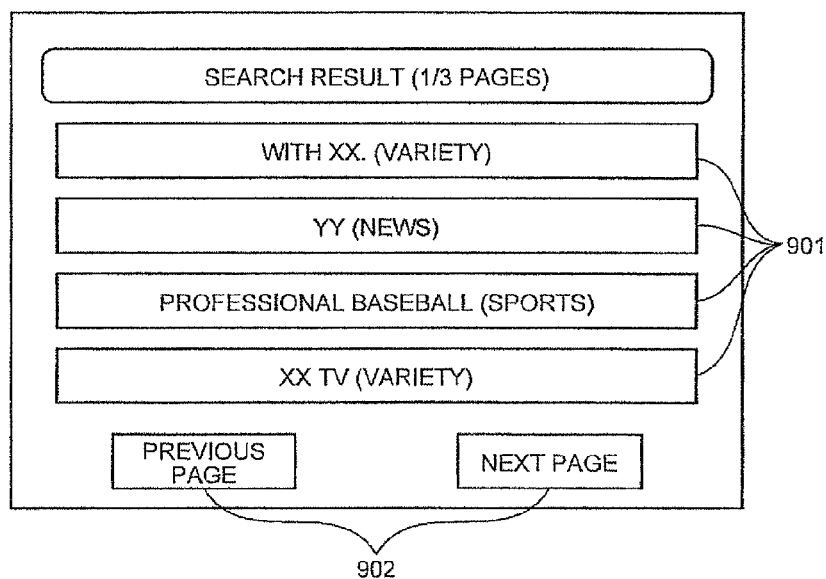
FIG. 11 is a diagram illustrating an example of a response.

In a storing unit 122, not only speech information is stored as prompts but also interaction scenarios including image information is stored as prompts. The interactive unit 132 determines speech information as well as image information as a prompt, and displays that information on a display screen (not illustrated) via the output unit 150. For example, when keywords to be searched are received as input speeches; the interactive unit 132 outputs, as a prompt, image information for a search result as illustrated in FIG. 11. The image information illustrated in FIG. 11 contains buttons 901 representing program titles obtained as search results. When the user presses such a button, detailed information of the corresponding program is displayed. Moreover, buttons 902 represent page turning buttons. For example, when "next page" button is pressed, the next four search results are displayed.

In the speech interactive apparatus 12, it is possible not only to output image information as a prompt on the display screen but also to display supplementary information such as a command list that indicates what needs to be input as a reply to the prompt being output at that point of time. Thus, by referring to such supplementary information, the user can understand the contents that need to be input. That enables the user to advance the interaction in a smooth manner. Meanwhile, in order to display supplementary information, the display area for the image information, which is originally displayed as a prompt on the display screen, needs to be reduced. For that reason, displaying the supplementary information may obstruct the button operations performed by the user.

In an identical manner to the manner in which the response control unit 134 according to the first embodiment performs control of re-outputting responses, the supplementary information control unit 138 according to the second embodiment performs control depending on whether or not a start instruction is issued after the output of a prompt and depending on the timing at which the start instruction is issued.

Figure 12:
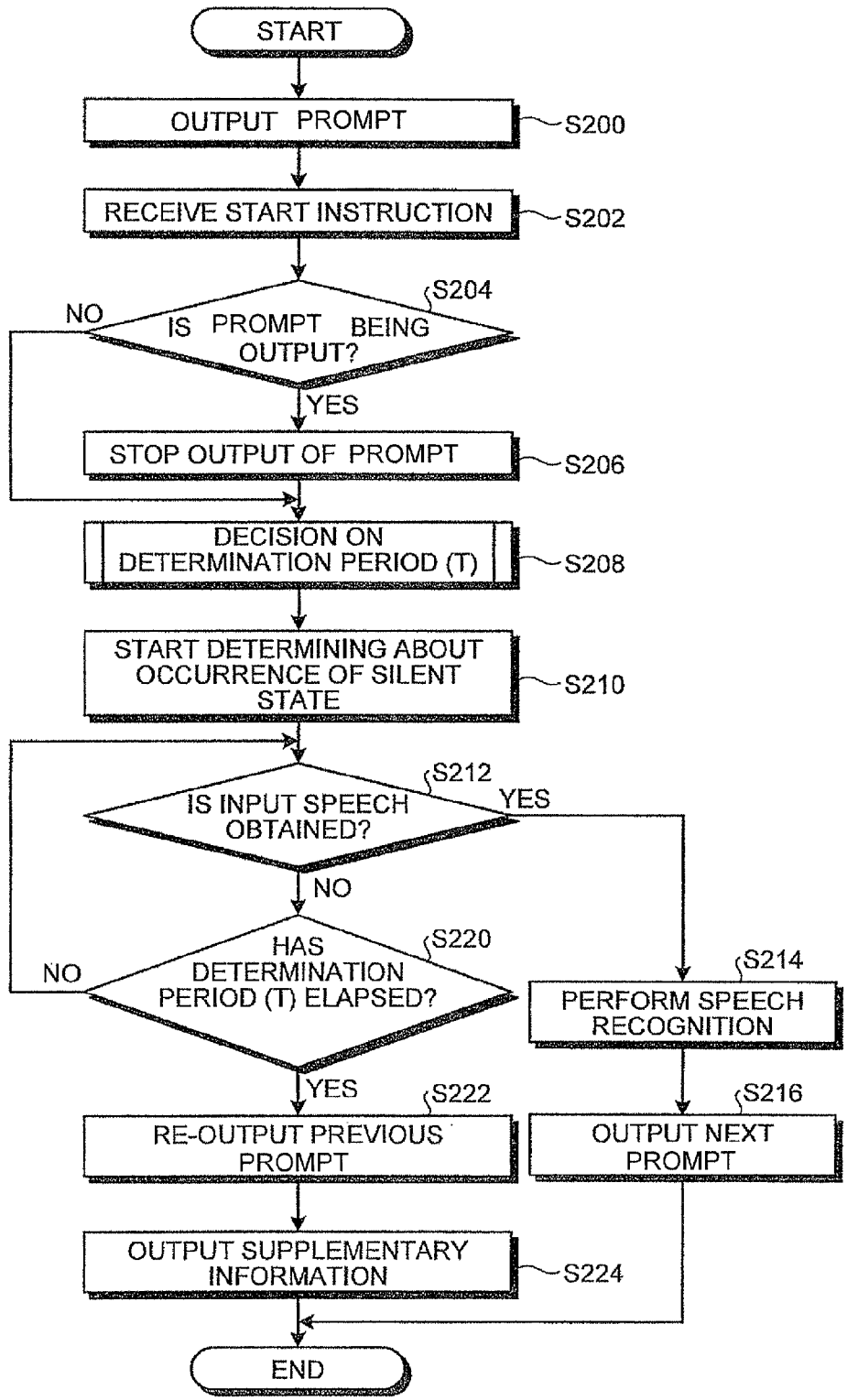
FIG. 12 is a flowchart for explaining an interaction operation.

As illustrated in FIG. 12, in an interaction operation during a speech interaction operation performed by the speech interactive apparatus 12, once a prompt is output (Step S200), a start instruction is received (Step S202). Subsequently, if the determination period elapses without obtaining a response (No at Step S212, Yes at Step S220), the response control unit 134 re-outputs the previous prompt (Step S222) and the supplementary information control unit 138 outputs supplementary information (Step S224). Meanwhile, the timing of re-outputting a prompt is substantially identical to the timing of outputting the supplementary information. Alternatively, as another example, the timing of re-outputting a prompt can follow or precede the timing of outputting the supplementary information.

The speech interaction operation performed by the speech interactive apparatus 12 is explained below with reference to an example of a system that performs a television program search. FIG. 13 illustrates an exemplary interaction performed in accordance with an interaction scenario that is stored in the storing unit 122. In this exemplary interaction, firstly, the speech interactive apparatus 12 issues a request for a program search condition (D801). With respect to that request, the user performs a speech input of a program name, a personal name, or a category (U802). Herein, at U802, "XX" is input as a personal name. Then, the speech interactive apparatus 12 searches for programs using the input condition; and, on the one hand, performs a speech output of the search result, and, on the other hand, displays an image of the search result on the screen (D803, FIG. 11). If a large number of searched items are retrieved in the search result, then the user is prompted to narrow down the search (D804). Once the user inputs a condition for narrowing down the search, the system outputs a notification that a refined search would be performed using the input condition (D806).

Figure 15:
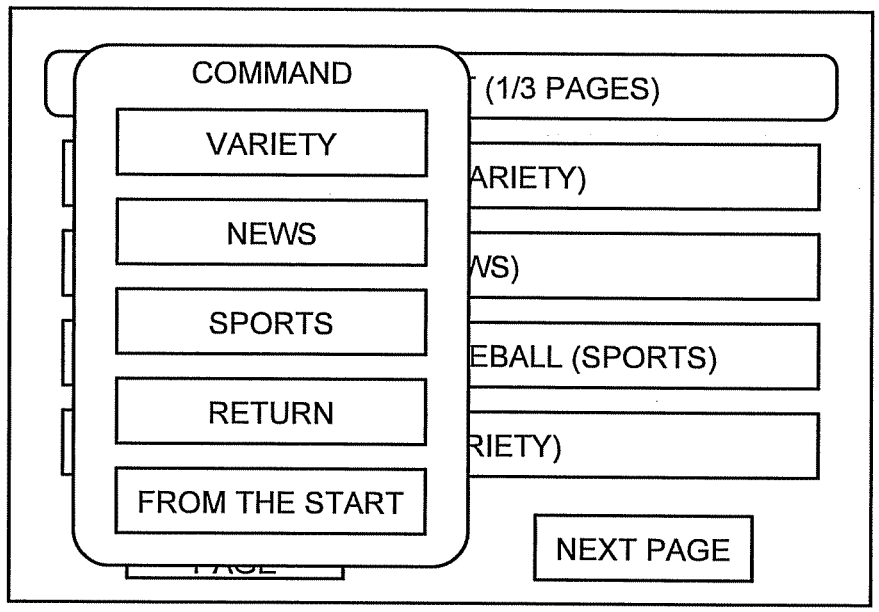
FIG. 15 is a diagram illustrating an exemplary display of supplementary information.

Given below is the explanation of a case when the user stops the output of a prompt at a relatively earlier timing since the start of that output. As illustrated in FIG. 14, at D804, assume that the prompt is stopped immediately before the timing at which a category for narrowing down the search is presented. Then, the user is not able to understand what to input next and thus goes silent. In such a case, the deciding unit 140 decides the determination period (T) of a relatively shorter duration, and the response control unit 134 re-outputs the prompt at an earlier timing. Besides, along with the re-outputting of the prompt of speech information, supplementary information (commands) is also displayed on the display screen in an overlapping manner as illustrated in FIG. 15.

Meanwhile, such supplementary information is no more displayed when a speech input from the user is detected to have ended. Moreover, the display format of the supplementary information is not limited to the display format according to the second embodiment. Thus, as a substitute to the display format illustrated in FIG. 15, the display can be switched from the image information of a prompt to the supplementary information. Still alternatively, the display area in the display screen can be partitioned so as to display not only the supplementary information but also the prompt.

In this way, by displaying the supplementary information on the display screen while a prompt is being re-output, it becomes easier for the user to reply. Moreover, by displaying the supplementary information only at the time of re-outputting a prompt, the supplementary information can be avoided from being unnecessarily displayed. That makes it possible to maintain the user-friendliness for the user to perform screen operations.

Meanwhile, the remaining configuration and operations of the speech interactive apparatus 12 according to the second embodiment are identical to the configuration and operations of the speech interactive apparatus 10 according to the first embodiment.

As a first modification example of the second embodiment, the supplementary information control unit 138 can be configured to output supplementary only when a prompt is stopped from being output and when the determination period (T) elapses without obtaining an input speech. That is, as long as a prompt is not stopped till the end, the supplementary information is not output even if the determination period (T) elapses without obtaining an input speech after the prompt has been completely output.

During an interaction accompanied by image information, if a prompt is stopped from being output with the aim of performing a speech input, it is likely that the user is willing to reply to the stopped prompt. In such a case, it is desirable to display supplementary information such as a command list so as to make it easier for the user to reply to the stopped prompt.

On the other hand, is a prompt is not stopped till the end, then it is presumable that the user has understood the commands which can be subjected to speech inputs or that the user trying to switch to screen operations. In either of the cases, there is no need to display the supplementary information. Rather, if the supplementary information is output, it may obstruct the screen operations.

There, as described above, the supplementary information is output on the screen only when a prompt that has been stopped is re-output. That makes it easier for the user to reply. Besides, since the supplementary information is not unnecessarily displayed, it becomes possible to maintain the user-friendliness for the user to perform screen operations.

As a second modification example, the supplementary information control unit 138 can be configured to determine whether to output the supplementary information or not depending on the length of the determination period (T) decided by the deciding unit 140. For example, the supplementary information control unit 138 compares the determination period (T) with a predetermined threshold value and, only when the determination period (T) is shorter than the threshold value, outputs the supplementary information according to the interaction operation described earlier. On the other hand, if the determination period (T) is equal to or longer than the threshold value, the supplementary information control unit 138 does not output the supplementary information even in the case when a prompt is re-output. As a result, the supplementary information is avoided from being unnecessarily displayed. That makes it possible to maintain the user-friendliness of screen operations.

As a third modification example, instead of outputting the supplementary information at substantially the same timing at which a prompt is re-output, the supplementary information control unit 138 can be configured to adjust the timing of outputting the supplementary information depending on the length of the determination period (T). More particularly, the supplementary information control unit 138 can make an adjustment in such a way that, longer the determination period (T), later is the timing of outputting the supplementary information. Then, the supplementary information control unit 138 outputs the supplementary information at that adjusted timing.

Figure 16:
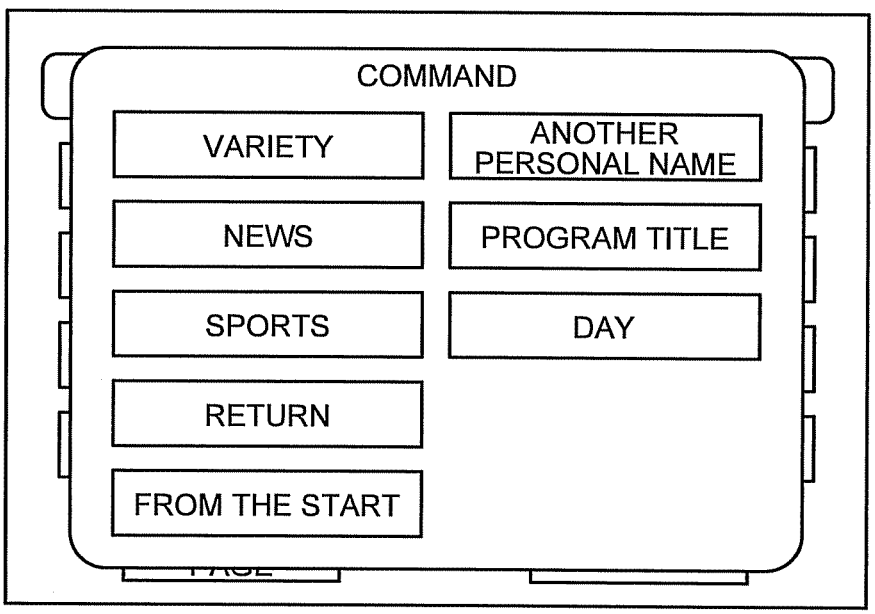
FIG. 16 is a diagram illustrating supplementary information.

As a fourth modification example, if the determination period (T) is equal to or longer than a predetermined threshold value, then the supplementary information can be configured to not only contain the contents that need to be requested to the user to input but also contain other information that can be input. Herein, the other information that can be input can be the information that, during a sequence of interactions performed in accordance with the interaction operation, is input by the user in the form of a response as a reply to any other prompt other than the previous prompt. For example, with reference to the exemplary interaction illustrated in FIG. 13, as illustrated in FIG. 16, supplementary information is output that contains information on a response that the user needs to input as a reply to another prompt, such as the personal name or the program title other than the category, included in the same interaction.

If a prompt sentence is not stopped from being stopped or is stopped only after a sufficiently long portion of the prompt is output, then there are times when the user is thinking of some different contents other than the request included in the prompt that has been output. In such a case, by presenting a wider scope of contents that can be input at that point of time, it becomes possible to enhance the user-friendliness of the speech interactive apparatus 12.

Given below is the explanation regarding the speech interactive apparatus 12 according to a third embodiment. As compared to the speech interactive apparatus 12 according to the second embodiment, the speech interactive apparatus 12 according to the third embodiment differs in the fact that the supplementary information is output prior to re-outputting a prompt. Herein, the speech interactive apparatus 12 according to the third embodiment has an identical configuration to the configuration of the speech interactive apparatus 12 according to the second embodiment. According to the third embodiment, the deciding unit 140 decides on a determination period ($T_1$) that is referred to for re-outputting a response as well as decides on a determination period ($T_2$) that is used referred to for outputting the supplementary information. After a prompt has been output, if the determination period ($T_2$) elapses without being notified of a speech input start event, then the supplementary information control unit 138 instructs the output unit 150 to output the supplementary information.

Herein, the determination period ($T_1$) is same as the determination period (T) explained in the first and second embodiments. When the determination period ($T_1$) elapses, a prompt is re-output. Thus, the determination period ($T_1$) represents a waiting period before re-outputting a prompt. Moreover, the determination period ($T_1$) is set to a sufficiently long duration so as to wait for a reply from the user. In the third embodiment, Td given in (Expression 1) is considered to be the determination period ($T_1$). Thus, the determination period ($T_1$) is set to be a fixed value.

On the other hand, the determination period ($T_2$) represents a waiting period before presenting the supplementary information to the user. The determination period ($T_2$) is shorter than the determination period ($T_1$) and is calculated according to (Expression 2).

$$T_2 = Td'*(To/b') \ (To<b')$$

$$= Td' \ \text{(no stopping until } To \geq b' \text{ or up to response end event)} \quad \text{(Expression 2)}$$

where, Td' is a default period, up to the outputting of supplementary information, that is set when the output of a prompt is not stopped till the end. Moreover, Td' is shorter than Td. Meanwhile, b' is a positive integer that determines the extent of increase in the determination period ($T_2$). Alternatively, b' can also be an estimated time of outputting a prompt.

In this way, depending on whether or not a start instruction is received while a prompt is being output, the deciding unit 140 decides on the determination period ($T_2$). Moreover, if a start instruction is received while a prompt is being output, the deciding unit 140 decides on the determination period ($T_2$) based on the timing at which the start instruction is received.

As long as the determination period ($T_2$) decided by the deciding unit 140 increases along with an increase in the time length To, the method by which the deciding unit 140 decides on the determination period ($T_2$) is not limited to the third embodiment. Moreover, the operation for deciding the determination period ($T_2$) is identical to the determination period deciding operation explained in the first embodiment with reference to FIG. 6.

Figure 17:
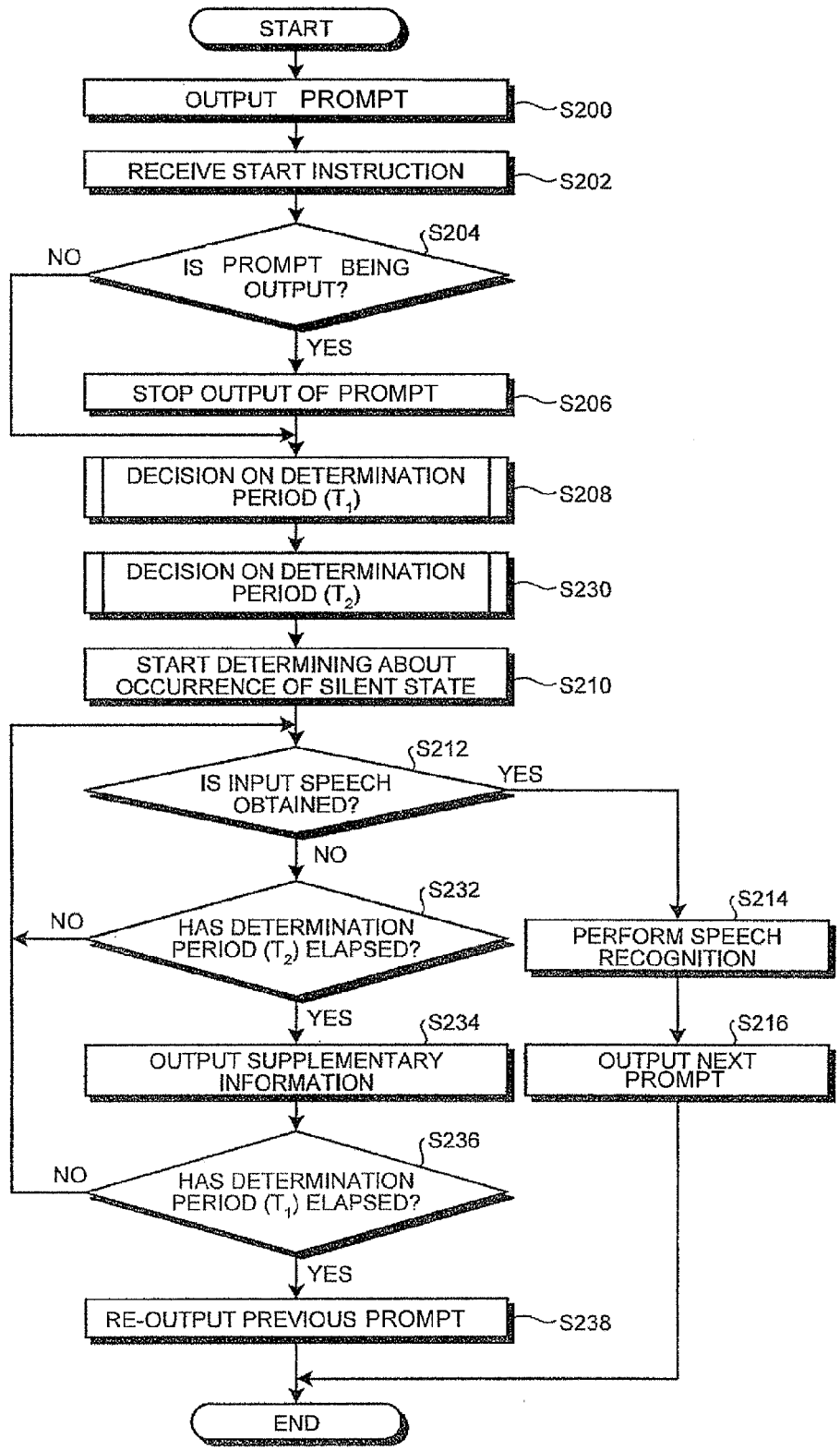
FIG. 17 is a flowchart for explaining an interaction operation.

Explained below with reference to FIG. 17 is the interaction operation performed by the speech interactive apparatus 12 according to the third embodiment. During the interaction operation, when the receiving unit 100 receives a start instruction (Step S202), the deciding unit 140 decides on the determination period ($T_1$) (Step S208) as well as decides on the determination period ($T_2$) (Step S230).

Subsequently, at Step S210, the response control unit 134 starts determining whether or not a silent state has occurred and the supplementary information control unit 138 also starts determining whether or not a silent state has occurred (Step S210). That is, the supplementary information control unit 138 obtains the determination period ($T_2$) from the deciding unit 140. Then, for a period of time starting from the timing of obtaining a speech input start event, which corresponds to the start instruction received at Step S200, up to the elapse in the determination period ($T_2$), the supplementary information control unit 138 monitors the time (No at Step S212, No at Step S232).

Subsequently, if the determination period ($T_2$) elapses without the speech recognizing unit 110 obtaining a response (Yes at Step S232), then the supplementary information control unit 138 instructs the output unit 150 to output the supplementary information (Step S234). At that time, the operations of the speech recognizing unit 110 are not cancelled and the speech recognizing unit 110 is retained in a state of receiving a speech input from the user.

Then, once the determination period (TA elapses (Yes at Step S236), the response control unit 134 re-outputs the response that was output at Step S200 (Step S238). That marks an end of the determination operation. Meanwhile, at the time of re-outputting a prompt, the operations of the speech recognizing unit 110 are cancelled and the speech recognizing unit 110 is not allowed to receive a speech input from the user.

As described above, in the speech interaction apparatus 12 according to the third embodiment, as in the case when a prompt is stopped, if a speech input start event is notified at a relatively earlier timing, the supplementary information is displayed at a relatively earlier timing before re-outputting a prompt. That enables avoiding a situation in which the user performs an erroneous speech input.

On the other hand, when a prompt is not stopped, the supplementary information becomes less necessary because the user has presumably understood the contents to be input. In that case, the display of the supplementary information is delayed. As a result, the user is not interfered while switching from performing a speech input to performing screen operations.

Figures 1, 2, 18:
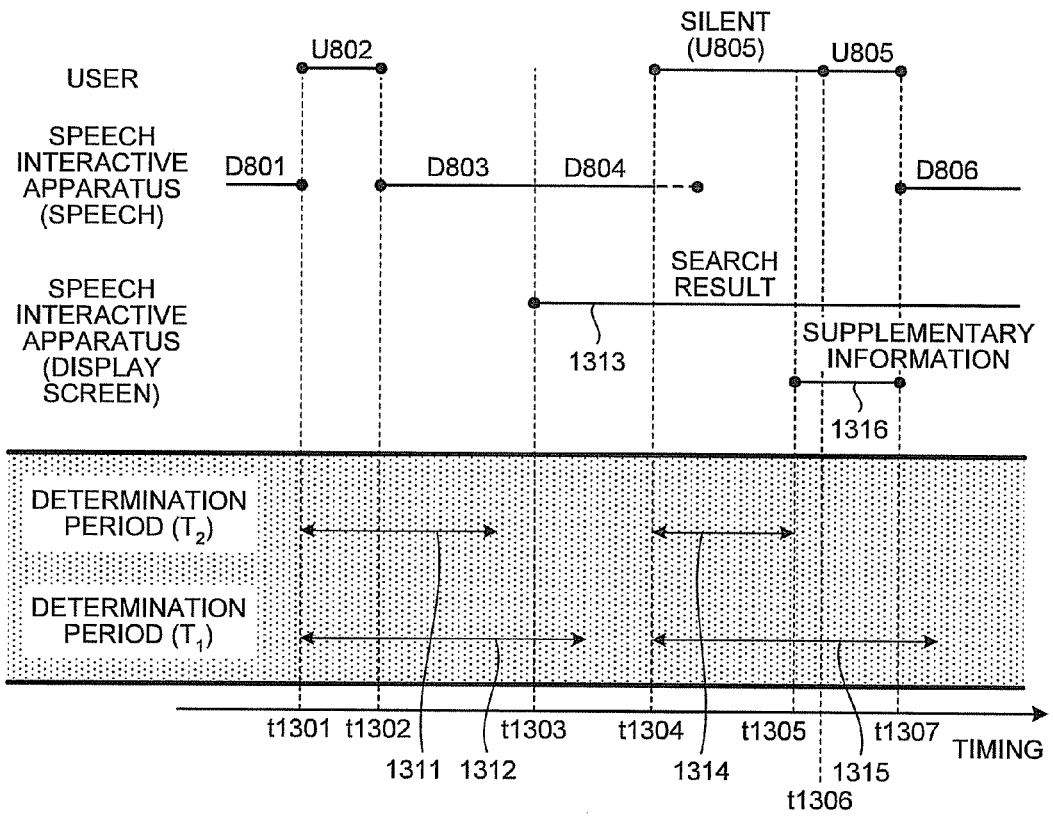

Explained below with reference to FIGS. 18-1 and FIGS. 18-2 is a case when, during the exemplary program searching interaction as illustrated in FIG. 13, the user stops a prompt, which is being output, at a relatively earlier timing.

As illustrated in FIGS. 18-1, the response (D801) is not stopped. Consequently, as illustrated in FIGS. 18-2; the determination period ($T_2$), which is set for the supplementary information at the time of starting the speech input U802, is set to Td' (1311) that is of a relatively longer duration.

Subsequently, at the prompt D803, a search result is output; and at the prompt D804, the user is prompted to narrow down the search candidates. However, while the prompt D804 is being output, the response speech thereof is stopped at a relatively earlier timing. In this case, since the time length To becomes shorter, the determination period ($T_2$) is set to a relatively shorter duration (1314). Moreover, since the user has mistakenly pressed the start button, the user is not able to understand what contents to input and thus goes silent. In the meantime, the determination period ($T_2$) elapses (1314) and the supplementary information is displayed (1316). Even after the supplementary information is displayed, the speech input from the user is awaited. Since the user can refer to the supplementary information and understand the contents that need to be input, it becomes possible for the user to start a speech input at a timing t1306.

In the speech interactive apparatus 12 according to the third embodiment, the determination period can be shortened as in the case of the determination period ($T_2$) (1314) illustrated in FIGS. 18-2. As a result, it becomes possible to avoid a situation in which erroneous contents get input due to the fact that the speech input from the user is received for an unnecessarily long period of time.

On the other hand, in the case when a prompt is stopped after being output for a relatively longer duration as well as in the case when a prompt is output till the end, the user is able to obtain sufficient information from that prompt. That makes it less necessary to present the supplementary information regarding that prompt. Thus, in such a situation, the display of the supplementary information is delayed so that the user is not interfered while switching from performing a speech input to performing screen operations.

Meanwhile, the remaining configuration and operations of the speech interactive apparatus 12 according to the third embodiment are identical to the configuration and operations of the speech interactive apparatus according to the other embodiments.

As a first modification example of the speech interactive apparatus 12 according to the third embodiment, the determination period ($T_1$) can be set to be variable in nature. In that case too, the determination period ($T_1$) is always longer than the determination period ($T_2$). More particularly, for example, the determination period ($T_1$) can be calculated according to (Expression 1) and the determination period ($T_2$) can be set to a value obtained by multiplying the determination period ($T_1$) with an integer equal to or smaller than 1. As another example, the determination period ($T_1$) can be set to a value obtained by adding a given length of time to the determination period ($T_2$)

Meanwhile, the speech interactive apparatus according to the embodiments has the hardware configuration of a normal computer that includes a control device such as a CPU; memory devices such as a ROM (Read Only Memory) and a RAM; external memory devices such as an HDD and a CD drive device; a display device such as a display; and input devices such as a keyboard and a mouse.

A speech interactive program that is executed in the speech interactive apparatus according to the embodiments is provided in the form of an installable or executable file on a computer-readable recording medium such as a CD-ROM, a flexible disk (FD), a CD-R, or a DVD (Digital Versatile Disk).

Moreover, the speech interactive program that is executed in the speech interactive apparatus according to the embodiments can be saved as a downloadable file on a computer connected to a network such as Internet. Alternatively, the speech interactive program that is executed in the speech interactive apparatus according to the embodiments can be made available for distribution through the network such as Internet. Still alternatively, the speech interactive program according to the embodiments can be installed in advance in a ROM.

The speech interactive program that is executed in the speech interactive apparatus according to the embodiments contains modules for each of the above-mentioned constituent elements (the receiving unit, the speech recognizing unit, the interaction control unit, the deciding unit, and the output unit). In practice, a CPU (processor) reads the speech interactive program from a recording medium and runs it such that the speech interactive program is loaded in a main memory device. As a result, the module for each of the above-mentioned constituent elements is generated in the main memory device.

According to at least one embodiment describe above, it is possible to ensure adequate interaction with the user without causing any inconvenience to the user even in the case when a response is stopped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech interactive apparatus comprising:
an output unit configured to output a first prompt which needs to be notified to a user;
a receiving unit configured to receive a start instruction of a speech input from the user as a reply to the first prompt;
a speech recognizing unit configured to perform speech recognition of a response that is input by the user;
an interactive unit configured to decide on a second prompt, which is determined according to a speech recognition result of the response, based on interaction information stored in a storing unit and instruct the output unit to output the second prompt;
a response control unit configured to stop the output of the first prompt when the start instruction is received while the first prompt is being output; and
a deciding unit configured to decide on a first determination period, which is used in determining whether or not a silent state has occurred, based on whether or not the start instruction is received while the first prompt is being output or based on the timing of receiving the start instruction, wherein
when the response is not input during a period starting from the reception of the start instruction till an elapse of the first determination period, the response control unit determines that the silent state has occurred and instructs the output unit to output the first prompt again.

2. The apparatus according to claim 1, wherein, shorter a period from a time of starting the output of the first prompt up to the time of receiving the start instruction, the deciding unit decides on the first determination time to be of a shorter duration.

3. The apparatus according to claim 2, further comprising a supplementary information control unit configured to, when the response is not input during a period starting from the timing of receiving the start instruction till the elapse of the first determination period, instruct the output unit to output supplementary information that contains information regarding the response that is input as the reply to the first prompt.

4. The apparatus according to claim 3, further comprising an interactive unit configured to decide on a prompt, which is determined according to the speech recognition result of the response, based on interaction information stored in a storing unit and instruct the output unit to output the prompt, wherein
when the response is not input during a period starting from the reception of the start instruction till an elapse of the first determination period that is set to be equal to or longer than a predetermined threshold value, the supplementary information control unit instructs the output unit to output supplementary information that contains information regarding the response that is input as a reply to the second prompt that is determined based on the interaction information.

5. The apparatus according to claim 3, wherein, longer the first determination period, the supplementary information control unit instructs the output unit to output the supplementary information at a later timing.

6. The apparatus according to claim 5, wherein, when the first determination period is shorter than a predetermined threshold value and when the response is not input during a period starting from the start of outputting the first prompt till the elapse of the first determination period, the supplementary information control unit instructs the output unit to instruct the supplementary information.

7. The apparatus according to claim 3, further comprising a supplementary information control unit configured to, when the response is not input during a period starting from the start of outputting the first prompt till the elapse of a second determination period that is shorter than the first determination period, instruct the output unit to output supplementary information that contains information regarding the response that is input as the reply to the first prompt.

8. A computer program product comprising a non-transitory computer readable medium including programmed instructions, wherein the instructions, when executed by a computer, cause the computer to execute:
outputting a first prompt which needs to be notified to a user;
receiving a start instruction of a speech input from the user as a reply to the first prompt;
performing speech recognition of a response that is input by the user;
deciding on a second prompt, which is determined according to a speech recognition result of the response, based on interaction information stored in a storing unit and instructing an output unit to output the second prompt;
stopping the output of the first prompt when the start instruction is received while the first prompt is being output; and
deciding on a first determination period, which is used in determining whether or not a silent state has occurred, based on whether or not the start instruction is received while the first prompt is being output or based on the timing of receiving the start instruction; and
determining, when the response is not input during a period starting from the reception of the start instruction till an elapse of the first determination period, that the silent state has occurred and instructing the output unit to output the first prompt again.

* * * * *